June 20, 1939.　　　　L. H. DAWSEY　　　　2,162,996
PROCESS FOR MAKING HYDROGEN PEROXIDE
Filed May 15, 1936　　　3 Sheets-Sheet 1
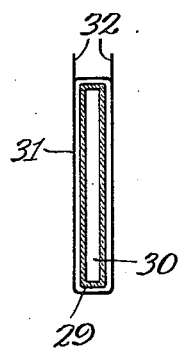
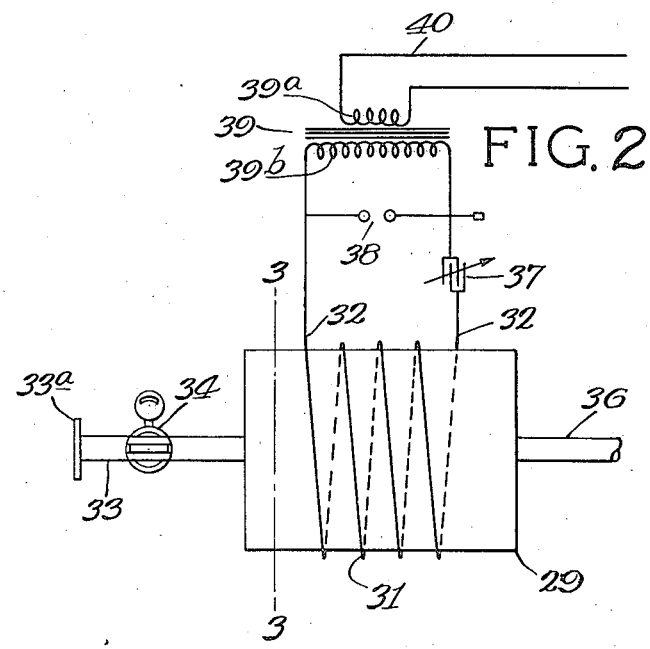
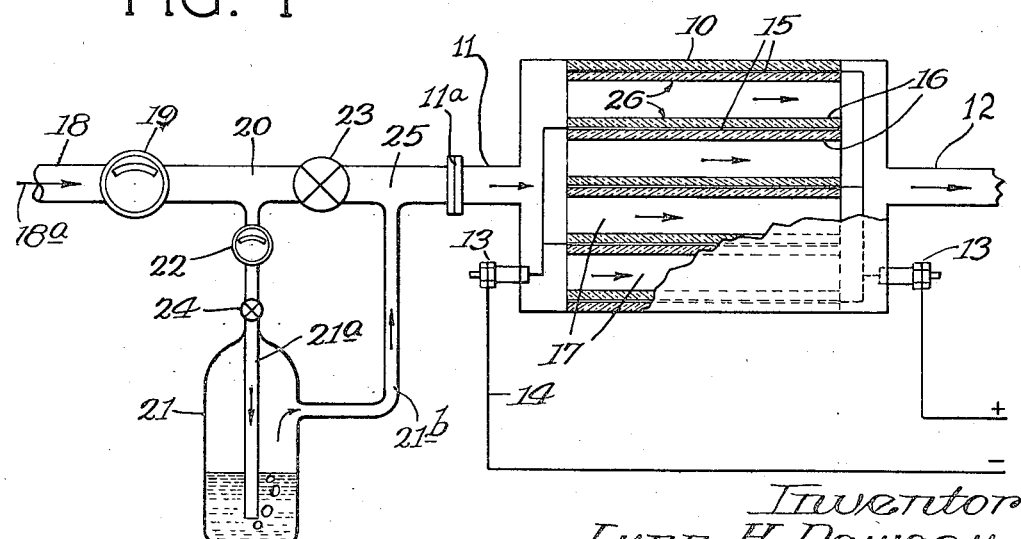
Inventor.
Lynn H. Dawsey
By Davis, Lindsey, Smith & Shonts, ns
UNITED STATES PATENT OFFICE 2,162,996

PROCESS FOR MAKING HYDROGEN PEROXIDE

Lynn H. Dawsey, Wooster, Ohio

Application May 15, 1936, Serial No. 79,903

7 Claims. (Cl. 204—31)

This invention relates to improvements in the synthesis of hydrogen peroxide, in the presence of hydrogen and oxygen, under the influence of an electrical discharge, and its purpose is to provide an improved method and apparatus by which hydrogen peroxide may be produced in this manner with such convenience and efficiency that the product may be sold commercially in successful competition with hydrogen peroxide produced by the methods heretofore in commercial use. The term "electrical discharge" is intended to refer to the ionization of a gas caused by the imposition of an electrostatic or an electromagnetic field, or both, on the gas, but it is not intended to refer to an arc type of electrical breakdown of a gas. Mixtures containing hydrogen and oxygen, for example, can be made to react to produce hydrogen peroxide by subjecting such mixtures, under appropriate conditions, to the influence of ionization such as may take place in the corona discharge, the silent electric discharge or the electrodeless discharge.

The term "silent electrical discharge" as specified in the appended claims is intended to cover each of the aforesaid types of discharge, but does not include the arc type.

It has been known for many years that hydrogen peroxide is formed when a mixture of hydrogen and oxygen is exposed to electrical discharge and many prior patents and publications have described processes whereby hydrogen peroxide may be produced by a method of this general type. Various suggestions have been made with respect to variations of pressure, temperature and other conditions under which the electrical discharge method of producing hydrogen peroxide may be carried on, including the suggestion that the process may be improved by introducing mercury vapor into the reaction gases prior to the discharge but, while many of these methods have resulted in the production of hydrogen peroxide in appreciable amounts, it appears that none of these proposed methods has reached such a degree of perfection as to justify its use on a commercial scale, particularly in competition with hydrogen peroxide produced by the persulfate processes which are now in common commercial use. This difficulty with the suggested electrical discharge methods has been due to the fact that production costs have been excessive on account of the electrical energy consumption which has been required by these methods, notwithstanding the fact that the raw materials are relatively cheap, the circulation of the gases is simple and the cost of labor and equipment comparatively low. For example, in the discussions of these prior suggested electrical discharge methods, where definite statements are made as to the output, it is said that the processes give from about seven grams to about nine grams of hydrogen peroxide per kilowatt hour, these amounts being mentioned as typical of the efficiencies obtainable by these processes. These amounts are too low to justify the use of such processes in commercial practice and it is therefore the purpose of the present invention to improve the electrical efficiency in processes of production of hydrogen peroxide by electrical discharge methods. In applicant's United States Patent No. 2,022,650, dated December 3, 1935, there is disclosed a method of producing hydrogen peroxide by which previously known efficiencies have been raised to the point of 16.7 grams of hydrogen peroxide per kilowatt hour while at the same time increasing the output of the cells to such an extent as to reduce materially the necessary pieces of equipment.

The principal object of the present invention is to provide an improved method and apparatus for further reducing the electrical power consumption as compared with that required in producing hydrogen peroxide by previously known electrical discharge methods. As a part of the present invention, it has been discovered that resins, gums, certain kinds of oils and particularly the polymerization products formed in the condensation of organic compounds, are advantageous in catalyzing the hydrogen-reaction under the influence of an electrical discharge. Such materials, for example, may be painted on the walls of the discharge chamber in which the reaction takes place, or the organic substances may be deposited, during the operation of the discharge, by adding organic vapors, in appropriate proportions, to the gas mixture. With either method of initially introducing the organic substances, the action of the discharge is such as to alter the chemical nature of the organic materials, resulting in their conversion and polymerization to form catalytically active coatings on the walls within the discharge chamber. In the application of organic compounds according to the present invention, substances of widely varying chemical structure may be employed.

It has been assumed in connection with prior electrical discharge methods of producing hydrogen peroxide that a homogeneous gas phase reaction occurs when hydrogen and oxygen are subjected to the influence of the electrical discharge and prior discussions of these methods have dealt principally with methods of controlling this supposed homogeneous gas reaction. In the case of the present invention, however, the proper utilization of the polymerized coatings of organic materials so accelerates the rate of hydrogen peroxide formation as to make the main reaction appear to be a heterogeneous one occurring, or at least initiated, at the surface of the catalyst; and, while it is not vital to the operation of the present invention that the exact function of these catalytic coatings in speeding up the formation of hydrogen peroxide be explained, it is believed that they introduce a wholly new type of reaction into the process. The result is to decrease the electrical energy requirements while at the same time increasing the hydrogen peroxide yield. Other objects of the invention include improvements in various features of the apparatus employed, improvements in compounding the gases used, improvements in principles of operation and in the application of the influence of electrical discharges to chemical reactions, effected either in the homogeneous and gas phase or by way of heterogeneous transformations, and to various features of the apparatus and the method which will appear more fully hereinafter.

The nature of the invention will be understood from the following specification taken with the accompanying drawings, which illustrate certain forms of apparatus embodying the invention which may be employed in carrying out the improved process. In the drawings, Fig. 1 shows a somewhat diagrammatic side elevation of the principal elements and circuit connections of one form of apparatus, embodying the present invention, which may be employed in carrying out the improved process of producing hydrogen peroxide, the reaction cell of this apparatus being shown partially in vertical section;

Fig. 2 is a somewhat diagrammatic view of a modified form of apparatus which may be employed in conjunction with a portion of the apparatus illustrated in Fig. 1, to produce hydrogen peroxide by the method of the present invention;

Fig. 3 is a sectional view taken on the line 3—3 of Fig. 2;

Figure 4:
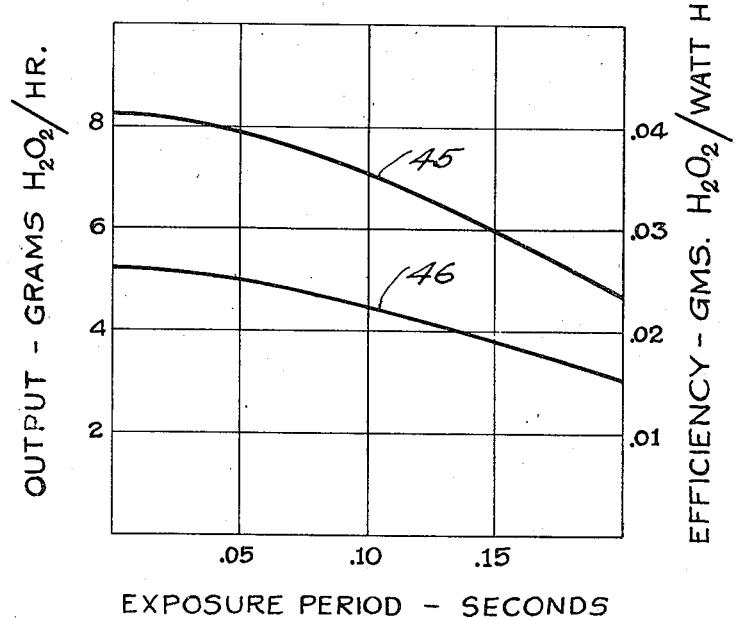

Fig. 4 is a chart showing curves which represent comparative hydrogen peroxide outputs with different periods of exposure of the gases in the discharge and also the efficiency of the apparatus represented by grams of hydrogen peroxide output per watt-hour of energy consumed; and Figs. 5, 6, 7 and 8 are other charts showing curves which represent the hydrogen peroxide output as compared with electrical efficiency, energy density, and other factors, all of which will be explained more fully hereinafter.

Referring to Fig. 1, the apparatus there illustrated comprises a reaction cell 10, shown in section, which is provided with a gas inlet conduit 11, a gas outlet conduit 12 and electrical terminals 13 which are connected by conductors 14 with a suitable source of electrical energy. The electrode elements of this cell comprise thin metal sheets 15, forming the electrodes proper, which are protected on both sides by dielectric sheets 16 of mica or other suitable material. These electrode elements are held apart by separators, not shown, thus forming intervening spaces or chambers 17 through which the gases pass while being subjected to the action of the electrical discharge. The electrodes 15 are so connected to the terminals 13 that the electrodes of opposite polarity are alternately spaced and when the conductors 14 are connected to a source of alternating or direct current, the gases passing through the spaces 17 become ionized and are thus brought into a highly reactive state. The hydrogen-oxygen mixture, containing an excess of hydrogen, and which may also contain certain amounts of other gases, is introduced into the cell 10 through the conduit 11 which in turn is connected through the joint 11ª with the supply conduit 18 into which gases flow in the direction indicated by the arrow 18ª. These gases flowing through the conduit 18 pass through the flow meter 19 and continue until they reach the point 20 where, if it be so desired, a part of the gas stream is diverted to pass downwardly into the vessel 21, while the remainder of the gases flow through the valve 23 and on through the conduits 18 and 11 into the cell 10. The proportion of the gas stream which flows into the chamber 21 is indicated by the flow meter 22 and may be regulated by the adjustment of the valve 23 and of a valve 24 which is located in the conduit leading to the vessel. The vessel 21, which is hereinafter termed the saturator, is partially filled with an organic material in liquid form, such as kerosene, benzol, xylol or pinene and the conduit 21ª which leads into this vessel discharges below the level of the liquid therein so that the gases bubble upwardly through the liquid and become saturated with the organic vapors. These saturated gases then flow upwardly through the conduit 21ᵇ and reunite with the main gas stream at the point 25. By properly regulating the valves 24 and 23, and by maintaining the saturator 21 at a suitable temperature, any desired concentration of the fresh organic vapors can be maintained in the gaseous reaction mixture which enters the corona cell 10. These organic vapors, entering the spaces 17 which constitute the reaction zones, are acted upon by the electrical discharge and are polymerized to form catalytic coatings on the dielectric surfaces 26 of the dielectric sheets 16. Hydrogen peroxide is thus formed under the influence of the electrical discharge on the gases and catalyst and it passes out through the discharge conduit 12 along with the hydrogen and oxygen which have escaped the action of the discharge. After the removal of the hydrogen peroxide from the mixture, the remaining gases discharged through the conduit 12 may be recirculated through the apparatus.

The foregoing description gives a general explanation of the mode of operation of the apparatus illustrated in Fig. 1 but, by way of a specific illustrative example, reference may be made to the results obtained when this apparatus is employed in a gas mixture consisting of about six per cent (6%) oxygen and about ninety-four per cent (94%) hydrogen. Assuming that this mixture is introduced into the system through the conduit 18, at such a rate that the average period of exposure within the discharge zones 17 is four hundredths (0.04) of a second, the valve 24 is closed and the valve 23 is initially allowed to remain open, so that all of the gases pass directly into the cell 10. An energy density of seventeen thousandths (0.017) to twenty-nine thousandths (0.029) watt per square centimeter of total surface area of the electrode elements, at a frequency of about one thousand (1000) cycles per second, is maintained across the electrodes, the thickness of the gas spaces being about thirty-five hundredths (0.35) mm. and the total thickness of the dielectrics 16 being about fifteen hundredths (0.15) mm. With these proportions and under these conditions, and with clean dielectric surfaces, hydrogen peroxide is formed in yields of from eleven (11) to seventeen (17) grams per kilowatt hour of energy consumed.

Assuming now that commercial xylol is placed in the saturator 11 which is maintained at a temperature of approximately 20 degrees C. and that, by proper readjustment of the valves 23 and 24, about five per cent (5%) of the total gas flow is caused to bubble through the xylol and becomes saturated with the hydrocarbon vapors which are then added to the main gas stream at 25, to produce a hydrocarbon concentration of approximately seven hundredths (0.07) per cent by volume, the electrical energy used in the cell decreases due to deposition of condensed products upon the surfaces of the dielectrics, whereupon the hydrogen peroxide output increases several fold and the power consumption is reduced with the result that yields of from forty (40) to sixty-five (65) grams of hydrogen peroxide (100% $H_2O_2$ by weight) per kilowatt hour of energy consumed are produced, depending upon the electrical energy density which is chosen.

The apparatus disclosed in Fig. 1 for saturating a portion of the gas stream with the vapors of organic materials may be employed in conjunction with a dielectric cell in which the surfaces of the cell are provided with polymerized coatings to accelerate the rate of hydrogen peroxide formation. One such form of apparatus is shown in Figs. 2 and 3, the dielectric cell there illustrated being adapted for use with the gas supplying and saturating portion of the apparatus shown in Fig. 1. As shown in Fig. 2, the dielectric cell 29, which is preferably formed of glass or the like, has an internal reaction chamber 30 of rectangular cross-section and the outer surface of the cell is wrapped by a helical winding of insulated copper wire 31 having terminals 32. A gas inlet conduit 33 leads to this tube and is supplied with a transverse flange 33ª which is adapted to form a part of the coupling shown at 11ª in Fig. 1 when the apparatus shown in Fig. 2 is employed with the gas supplying apparatus shown at the left of the point 11ª shown in Fig. 1. A pressure regulator 34 is connected in the conduit 23 to indicate the pressure at which the gas mixture is supplied to the reaction chamber which, by reason of its rectangular cross-section, is adapted to give a maximum surface area for a minimum gas volume therein. The winding 31 on the dielectric cell may be energized in various ways by means of a high frequency electric current but there is shown in the drawings, for illustrative purposes, a circuit which includes a variable condenser 37, an adjustable spark gap 38 and a transformer 39 comprising a primary winding 39ª and a secondary winding 39ᵇ, the latter winding being connected across the terminals of the adjustable spark gap and in series with the condenser. The primary winding 39ª is connected by conductors 40 with a source of interrupted current having suitable characteristics. Assuming that a high frequency field of about 1000 kilocycles per second is produced in the reaction chamber 30 by adjusting the spark gap 28 and the condenser 37 with the transformer 39 properly excited, a hydrogen oxygen mixture containing an excess of hydrogen is introduced through the tube 33 and the pressure regulator 34 and caused to flow through the reaction chamber from which the gases are discharged through the conduit 36. Upon reducing the pressure of the gases in the chamber 30, by means not shown, the gases become ionized by the action of the electrical discharge in the reaction chamber with the result that hydrogen peroxide is formed and is discharged through the tube 36. This production of hydrogen peroxide may be increased by applying a coating of abietic acid, for example, to the walls of the reaction chamber before energizing the winding 31. This coating may be effected, for example, by filling the vessel 29 with abietic acid-ether solution and then draining the solution from the chamber. The application of this coating to the walls of the reaction chamber results in a material increase in the amount of hydrogen peroxide produced as compared with the operation when the interior surfaces of the walls are uncoated and even higher yields may be obtained by introducing into the gaseous mixture, prior to its entry into the conduit 33, gases saturated with the vapors of organic materials by means of the apparatus disclosed at the left of the point 11ª in Fig. 1. For example, about five hundredths per cent (0.05%) of kerosene vapors in the gaseous mixture introduced through the tube 33 will materially increase the yield of hydrogen peroxide. As in the case of the apparatus previously described, the gases discharging from the chamber 30 through the conduit 36 may be recirculated through the apparatus after separating the hydrogen peroxide therefrom.

A large number of other materials may be used as substitutes for kerosene, xylol and abietic acid, which are mentioned in the foregoing examples, provided due consideration be given to the vapor pressure of the respective materials, the amounts added to the reaction gases in case volatile substances are employed, and the speeds of polymerization under the influence of the discharges. For example, the benzol, the toluol, the xylol, the cumol and the pseudocumol fractions, including such substances as indene and cumarone from the distillation of coal tar, have been found to supply highly active catalytic coatings. The polymerization products from turpentine and pine oils, such as dipentene, limonene, pinene and the like, have been found to cause exceptionally good electrical efficiencies when added in suitable proportions to the reaction gases. Certain aldehydes, such as benzaldehyde and furfural, give catalytic coatings upon condensation within the discharge, comparable in peroxide producing capacity to films formed from benzol, indene, turpentine and the like. Petroleum products consisting of mixtures of saturated and unsaturated bodies are also applicable to this process. For example, the unrefined fractions of gasoline, kerosene and certain light oils from petroleum may be employed to advantage due to their comparatively low cost.

The normal physical states of the organic materials employed in the practice of the invention are of secondary importance as compared with the physical character of the polymerized products which form on the walls of the apparatus under the influence of the electrical discharge. The coatings which are most active in producing hydrogen peroxide are those which are plastic or semi-plastic, are not dry and do not flake off. Liquid products which have a tendency to collect in droplets do not cover the surfaces completely, and since the main reaction is apparently a heterogeneous one, the discharge is not utilized to its greatest advantage over those areas not covered by the resins. The organic materials which have been found to cover the surfaces most completely are those which condense to give gum-like coatings under the influence of the electrical discharge. For example, styrene polymerizes rapidly in the discharge in the presence of hydrogen and oxygen to give partially a powder-like material which does not cover the surfaces uniformly, while a substance like decane polymerizes slowly with the intermediate formation of liquid products which collect in droplets and also fail to cover the surfaces completely; but by introducing both styrene and decane together in the discharge in appropriate proportions with the reaction gases, a coating of desirable physical properties and high activity is obtained. The films on the surfaces of the reaction chamber may be of the adsorbed type, invisible to the eye, or the coatings may be deposited in substantial quantities. Active resins may also be formed from acetylene and ethylene but in the absence of oxygen.

The most active coatings are those deposited directly from the gas phase onto the surfaces in the reaction zone, although substances like rosin, when painted on the walls, become activated on aging in the discharge. It has been found advantageous in certain instances to apply to the surfaces of the reaction chamber a foundation coating of materials such as rosin, cuprene or a synthetic resin, such as one of the alkyd type, and then to maintain an active surface film over the foundation coating by polymerizing one of the above named volatile organic substances from the gas phase as explained in connection with the operation of the apparatus shown in Figs. 2 and 3.

Although the improvement of the present invention is concerned chiefly with the catalysis of the peroxide-forming reaction in hydrogen and oxygen under the influence of an electrical discharge in the presence of certain resin catalysts, it will be understood that the yield of hydrogen peroxide may be improved also by giving proper attention to other conditions of operation such as the concentration of oxygen in the gas mixture, the time of exposure of the gases to the discharge, the energy distribution within the discharge and particularly to the energy density of the discharge. The optimum concentration of oxygen in the gases lies in the range from about four per cent (4%) to about six per cent (6%), when working at atmospheric pressure. The electrical efficiency has been found to drop off sharply below about three per cent (3%) while above three per cent (3%) the efficiency increases slightly with increasing oxygen concentration. Since explosive mixtures result with more than about eight per cent (8%) of oxygen at atmospheric pressures, higher concentrations are not capable of being used in this process. When operating under reduced pressures, however, the non-explosive range is considerably widened, so oxygen concentrations greater than eight per cent (8%) may be employed under those conditions even though the increase in electrical efficiency may not be material. The presence of appreciable water vapor in the gas mixture, such, for example, as that occurring when the gases are passed over ice, is not immediately harmful or beneficial when the discharge is operated in conjunction with the resin catalyst and the reaction chamber is kept at or somewhat above room temperatures. On the other hand, substantially dry gases may also be used in the process.

The rate of flow of the gas mixture through the discharge has an important effect upon the economic operation of the process inasmuch as this factor, together with the dimensions of the reaction chamber, determines the period of time during which the gases are subjected to the joint action of the discharge and the catalyst. The electrical discharge operates to promote the formation of peroxide but it is capable of destroying the peroxide after it has been formed provided the reaction products are not quickly removed from the discharge zone. The rate of destruction of the peroxide is dependent not only upon the exposure time but also on the intensity of the electrical discharge; the optimum exposure period of the gases in the discharge is in itself a variable, depending upon the electrical energy density in the reaction chamber. When all workable energy density ranges are included the time of exposure of the gases may be said to vary from about two-tenths (0.2) of a second to one-hundredth (0.01) of a second, the shorter periods being preferred. The average exposure periods of the present invention lie within this range.

The effect of different periods of exposure of the gases to the electrical discharge may perhaps be more clearly understood by reference to Fig. 4 of the drawings, where two curves are shown. The ordinate of the upper curve 45 represents hydrogen peroxide output in grams per hour and the abscissa of that curve represents the exposure period in seconds when the process is carried out in apparatus such as that shown in Fig. 1, and when the discharge is operated with an energy density of about one-tenth (0.1) watt per square centimeter of active surface in the reaction chamber. In this case, the active surface consisted of a coating of aged abietic acid on the walls. For the purposes of this invention, aged abietic acid is the product resulting after the electric discharge has acted upon the abietic acid for at least a short period of time. The lower curve 46 is a plot of the electrical efficiency, the ordinate of this curve representing grams of hydrogen peroxide produced per watt hour while the abscissa represents the exposure periods in seconds when operating at the same energy density as that referred to in connection with the curve 45. It will be observed that both the efficiency and the hydrogen peroxide output fall off rapidly when the gases are allowed to remain in the discharge too long. In the case of the constant energy density chosen for this example, the process operates better with exposure periods of shorter duration than about eight hundredths (0.08) of a second. This example is given merely for purposes of illustration and the invention is not to be construed as being limited to the practice of the process with an energy density of about one-tenth (0.1) of a watt per square centimeter of exposure surface. This particular energy density is higher than those usually preferred. When lower energy densities are employed, the rate of exposure may be considerably lengthened without loss of electrical efficiency.

Prior patents and publications dealing with the subject of the production of hydrogen peroxide by the electrical discharge method have given no definite information concerning the effect of exposure times of the reaction gases and little importance has heretofore been attached to the proper relation which must exist between the exposure period of the gases and the energy which is expended in them. Aside from the question of energy density, it is important that the present invention definitely sets forth a range of exposure periods different from any which may be supposed to have been employed or suggested in the prior art. The range of exposure period specified has been found to possess particular advantage over longer periods not only on account of the improved efficiencies obtainable but because of other new results which are simultaneously produced and which are not predictable on a basis of the previous knowledge of the simple effect of changing rates of gas flow.

Contrary to the principles which have been followed in the construction of apparatus heretofore employed in the electrical discharge method of producing hydrogen peroxide, where relatively large gas capacities have been provided with minimum surface area, the present invention discloses the advantage of using a small gas volume in conjunction with a large surface area and the apparatus should preferably be constructed so as to realize a maximum surface area in combination with a minimum gas volume. This may be accomplished by bringing the walls of the reaction chamber as close together as possible without making contact while at the same time leaving a gas space of uniform thickness between the walls. In practice, it has been found, for example, that gas spaces of suitable thickness lie in the range between two tenths of a millimeter (0.2 mm.) and one millimeter (1.0 mm.) with a preference for an optimum thickness between three tenths of a millimeter (0.3 mm.) and five tenths of a millimeter (0.5 mm.). The treatment of gases in these thin layers has the advantage of giving a maximum surface with a minimum gas volume and it also enables the gases to be exposed to the discharge for relatively short periods of time. With this construction of the discharge chamber, shorter exposures may be realized without necessarily endeavoring to increase the rate of flow of the gases. The alteration of the characteristics of the electrical discharge produced by bringing the walls of the reaction chamber close together also has a far reaching effect upon the economics of the process. In the first place, since the electrical energy is expended principally in ionizing the gases, the reduction of the thickness of the gas layer in the reaction zone also reduces the amount of gas which must be kept in an ionized state and the electrical energy is then expended more in proximity to the walls of the reaction chamber and less in the form of thermal energy in the gas. Further, the distribution of electrical energy tends to become more uniform between the walls and the energy density of the discharge may be reduced to low values by regulation of the electrical potential, while still keeping the gases in a reactive state such that the maximum influence of the catalyst is exerted in forming hydrogen peroxide. These newly discovered factors operate in combination to provide a very efficient method of producing hydrogen peroxide.

The effect of the energy density of the electrical discharge, when uniformly distributed over the surface of the reaction chamber, may be further illustrated by reference to several examples of results obtained when the process of the present invention is operated in suitable energy density ranges with different resin catalysts. These results are shown in Figs. 5, 6, 7 and 8, where the lower curves represent variations of hydrogen peroxide output with variations in the reciprocal of the energy density, the ordinates representing hydrogen peroxide output and the abscissae the units of surface area per watt hour expended. The upper curves in these figures show variations of the electrical efficiency with changes in the reciprocal of the energy density, the ordinates representing the efficiency. The abscissae thus represent units of reaction chamber surface upon which one watt of energy is expended per hour. These diagrams illustrate the dependence of hydrogen peroxide output upon energy density and also the dependence of the efficiency of the process upon energy density. The results here plotted are typical of those obtained when the process is carried out in an apparatus similar to that represented in Fig. 1 when operating with an optimum oxygen concentration of about six per cent (6%), an exposure period for the gases in the discharge of about four hundredths (0.04) second and with a gas space thickness between three tenths of a millimeter (0.3 mm.) and nine tenths of a millimeter (0.9 mm.).

Figure 5:
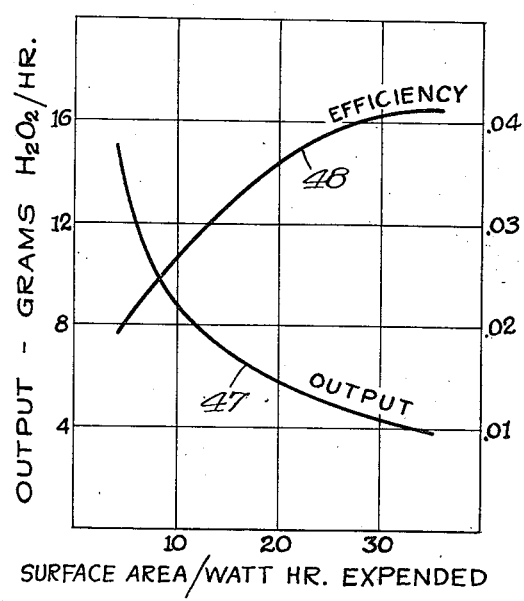

Referring to Fig. 5, the curve 47 represents the hydrogen peroxide output and the curve 48 represents the efficiency obtainable when operating with a gas space thickness of nine tenths of a millimeter (0.9 mm.) and a resin catalyst consisting of the polymerization products of abietic acid and kerosene applied to the walls of the reaction chamber. The coating of the walls was effected by painting a solution of abietic acid on the surfaces and was maintained by flowing a trace of kerosene vapor through the discharge chamber along with the hydrogen and oxygen. The results which are plotted in Fig. 5 show that, while the amount of hydrogen peroxide formed is proportional to the energy expended in the discharge, it is not directly proportional in a linear manner. While the output falls off with decreasing watt density, the area of the active surface of the catalyst is increasing in proportion to the wattage consumed so that the beneficial effect of the catalyst then begins to play a prominent part at the lower energy densities. Better electrical efficiencies are obtained as the energy density is lowered. A further increase in the surface area beyond that of about thirty-five (35) square centimeters per watt of energy results ultimately in the extinction of the discharge, at least when operating with a gas space having the thickness of nine tenths of a millimeter (0.9 mm.) referred to above. As before stated, considerably lower energy densities may be obtained by reducing the thickness of the gas space.

Figure 6:
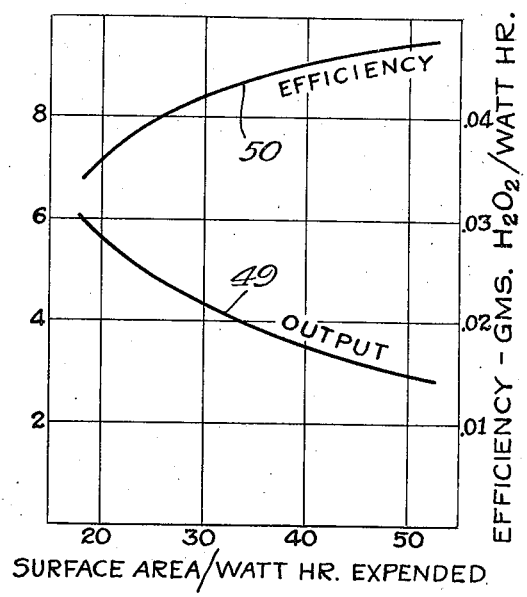

In Fig. 6, the curve 49 shows the dependency of the hydrogen peroxide output and the curve 50 represents the variation of efficiency with energy density when employing a resin catalyst of benzol origin in a gas space having a thickness of three tenths of a millimeter (0.3 mm.). In this example, the coating was obtained by flowing a trace of benzol vapor through the discharge chamber with the mixture of hydrogen and oxygen. While the output and the electrical efficiency, at equivalent energy densities, are about the same for this benzol vapor as with the abietic acid kerosene catalyst referred to in connection with Fig. 5, it will be observed that better efficiencies are evident when employing the benzol resin at the lower watt densities on account of the reduced gas space thickness.

Figure 7:
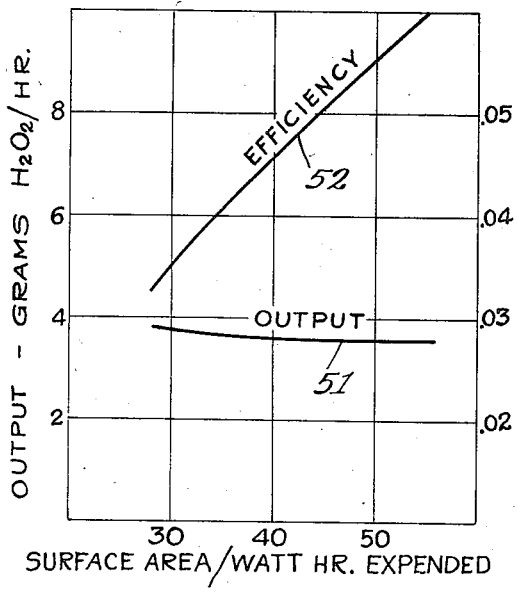

The curves plotted in Fig. 7 illustrate the output and efficiency obtainable with a resin formed by polymerization of the indene fraction from coal tar when operating at slightly lower energy densities in the electrical discharge and when employing a gas space thickness of three tenths of a millimeter (0.3 mm.). The curve 51 represents the output and the curve 52 represents the efficiency under these conditions. This type of resin is seen to give a better efficiency than the benzol resin at the lower energy densities but a lesser efficiency at the higher energy densities. The indene resin tends to bring about a peroxide output having a substantially constant value, nearly independent of the energy expended in the discharge.

Figure 8:
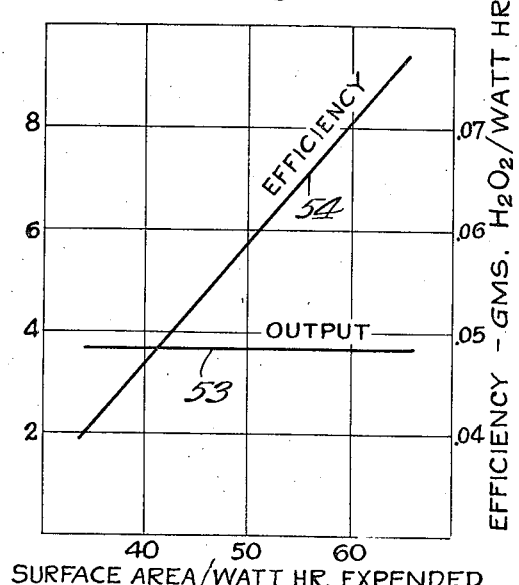

In Fig. 8, the curve 53 represents the output and the curve 54 represents the efficiency when the process is carried on with a gas space thickness of three tenths of a millimeter (0.3 mm.) and with a resin coating formed by polymerization of limonene in the discharge. In the energy density range between fifteen thousandths (0.015) and twenty-nine thousandths (0.029) watt per square centimeter, the output is independent of the energy expended, so that the efficiency is inversely proportional to the energy consumed. In this example, the process proceeds almost entirely by catalytic means so long as the activating influence of the ionization is not destroyed through extinction of the discharge.

Although various examples of the improved method and of apparatus embodying the invention have been set forth by way of illustration, it will be understood that the method may be practiced in various ways and that the apparatus may take various forms coming within the scope of the appended claims.

I claim:

1. The method of producing hydrogen peroxide which consists of subjecting a gaseous mixture comprised essentially of from 2 to 8 percent oxygen and 92 to 98 percent hydrogen to the action of a silent electrical discharge in the presence of an organic compound which polymerizes in said discharge to give a resin-like deposit and belongs to the class consisting of unsaturated hydrocarbons and their oxygen derivatives.

2. The method of producing hydrogen peroxide which consists of subjecting a gaseous mixture comprised essentially of from 2 to 8 percent oxygen and 92 to 98 percent hydrogen to the action of a silent electrical discharge in the presence of the resin-like deposit formed through the polymerizing action of said discharge upon unsaturated hydrocarbons.

3. The method of producing hydrogen peroxide which consists of subjecting a gaseous mixture comprised essentially of from 2 to 8 percent oxygen and 92 to 98 percent hydrogen to the action of a silent electrical discharge in the presence of the resin-like deposit formed through the polymerizing action of said discharge upon benzol vapor.

4. The method of producing hydrogen peroxide which consists of subjecting a gaseous mixture comprised essentially of from 2 to 8 percent oxygen and 92 to 98 percent hydrogen to the action of a silent electrical discharge in the presence of the resin-like deposit formed through the polymerizing action of said discharge upon dipentene vapor.

5. The method of producing hydrogen peroxide which consists of subjecting a gaseous mixture comprised essentially of from 2 to 8 percent oxygen and 92 to 98 percent hydrogen to the action of a silent electrical discharge in the presence of the resin-like deposit formed through the polymerizing action of said discharge upon the vapors of unrefined kerosene.

6. The method of producing hydrogen peroxide which consists of subjecting a gaseous mixture comprised essentially of from 2 to 8 percent oxygen and 92 to 98 percent hydrogen in layers less than one millimeter but greater than one tenth millimeter in thickness to the action of a silent electrical discharge in the presence of the resin-like deposit formed through the polymerizing action of said discharge upon unsaturated hydrocarbons.

7. The method of producing hydrogen peroxide in a reaction chamber which comprises the steps of subjecting a gaseous mixture consisting essentially of from 2 to 8 percent oxygen and 92 to 98 percent hydrogen to the action of a silent electrical discharge in the presence of the resin-like deposit formed through the polymerizing action of said discharge upon unsaturated hydrocarbons, and regulating the character of the discharge by maintaining an energy density in the range of fifteen one thousandths (0.015) of a watt to one tenth (0.1) of a watt per square centimeter over the active resin-covered surface within the discharge zone.

LYNN H. DAWSEY.